Aug. 25, 1942.   R. S. KAIL   2,293,904
METHOD OF BATCH CEMENTING
Filed Sept. 22, 1939

RAY S. KAIL.
INVENTOR.
BY Jesse R. Stone
Lester B. Clark
ATTORNEYS.

Patented Aug. 25, 1942

2,293,904

UNITED STATES PATENT OFFICE 2,293,904

METHOD OF BATCH CEMENTING

Ray S. Kail, Houston, Tex., assignor to Baker Oil Tools, Inc., Vernon, Calif., a corporation of California Application September 22, 1939, Serial No. 296,014

10 Claims. (Cl. 166—22)

The invention relates to a method of cementing oil and gas wells to eliminate the entrance of water therefrom as much as possible.

In actual practice it has been found that the oil occurring in the earth formations is usually floating on top of a body of salt water which acts as the motivating agent which traps the oil beneath a cap rock or other impervious formations in the earth. When the well penetrates a cap rock the oil and gas are removed. It is the object of the present invention to close off the porous formation in the lower reaches thereof so as to shut off to the greatest extent possible the encroachment of any water into the well bore. When this is accomplished it has been found that the oil and gas will continue to seep into the upper reaches of the formation and enter the well so that a maximum of production can be obtained from the formation.

The present invention concerns itself with a method of cementing off the lower reaches of the formation and broadly contemplates introducing the cement in small batches at predetermined pressures at which the cement will enter a water formation but will not necessarily enter that part of the formation containing oil and gas.

It is the theory of the present invention that the formation can be best closed off by stages, that is, that a small batch of cement is introduced into the well bore and forced into the formation at a pressure which must not exceed a predetermined amount and which is calculated as a function of the depth of the well so as to take into consideration the static pressure on the formation and which is also calculated in a manner that the cement will not cause any scouring action in the pores of the formation.

It is intended that a small batch of cement will be introduced so as to partially close the pores of the formation. This cement is allowed to take an initial set and then another lining or batch of cement is introduced to further close the pores and be deposited upon the initial deposit of cement. This building up of the cement in the pores of channels of the formation gradually closes the pores and thereafter prevents the migration of salt water thru the formation.

The pressures utilized to introduce the cement and the amount of cement used are of the essence of the invention because it has been found in actual practice that if too great a pressure is used the pores seem to be clogged temporarily and thereafter the formation reopens and the jobs have been found to be unsuccessful; whereas, in other instances if large amounts of cement are introduced continuously it is thought that the cement serves to scour out the pores of the formation and beyond predetermined limits it has been found that large quantities of cement can be forced into the formation and the pressure required to introduce it actually falls off, rather than increasing. In some instances it has been possible to pump an indefinite amount of cement into a porous formation and it entirely disappears.

Obviously all of the pores in the formation are not of the same size and naturally the cement slurry which is introduced being rather viscous will enter the larger pores and will only enter the smaller pores when the pressure at which the cement is applied is increased. It is therefore intended that batch after batch of cement will be introduced and each batch permitted to take its initial set before the next batch is introduced and these batches are small in size because only a small deposit of cement is to be made in each pore so that it will cause a deposit in the pore before subsequent deposits may be made.

There are various sets of conditions which are encountered in oil, gas and water wells and for purposes of illustration the following sets of conditions are outlined: (I) Oil and water; (II) oil, water and gas; (III) gas and water; (IV) water only; (V) gas only; (VI) oil and sand; and (VII) oil and gas.

It is one of the objects of the present invention to cement an earth formation by introducing separate batches of cement to the same formation.

Another object of the invention is to close a porous formation in the earth by introducing a batch of cement, allowing such cement to take an initial set and subsequently introducing additional small batches of cement so as to progressively close up the porous areas of the formation.

Another object of the invention is to introduce a small batch of cement into a porous formation at a predetermined pressure and if the formation will accept the cement, to then subsequently introduce a second and similar batch and to continue this procedure until the formation is gradually closed by these accumulating deposits of cement.

Another object of the invention is to introduce cement into a well at a pressure in pounds per square inch not to exceed forty percent of the depth of the well in feet plus twelve hundred pounds.

Another object of the invention is to introduce a small batch of cement slurry having a specific gravity greater than fifteen and one-half pounds per gallon into an earth formation at a pressure calculated as a function of the depth of the well plus a constant.

Another object of the invention is to squeeze cement into the lower reaches of a porous formation by introducing it in small batches so as to provide accumulating deposits into pores of the formation and eventually creating a substantially solid block of material which will compel any water being forced into the formation to travel around the block of material in such a manner that the encroachment will necessitate depletion of the oil and gas in the upper reaches of the formation.

Other and further objects of the invention will be readily apparent when the following description is considered in connection with the accompanying drawing in which.

Figures 1, 2, 3, 4:
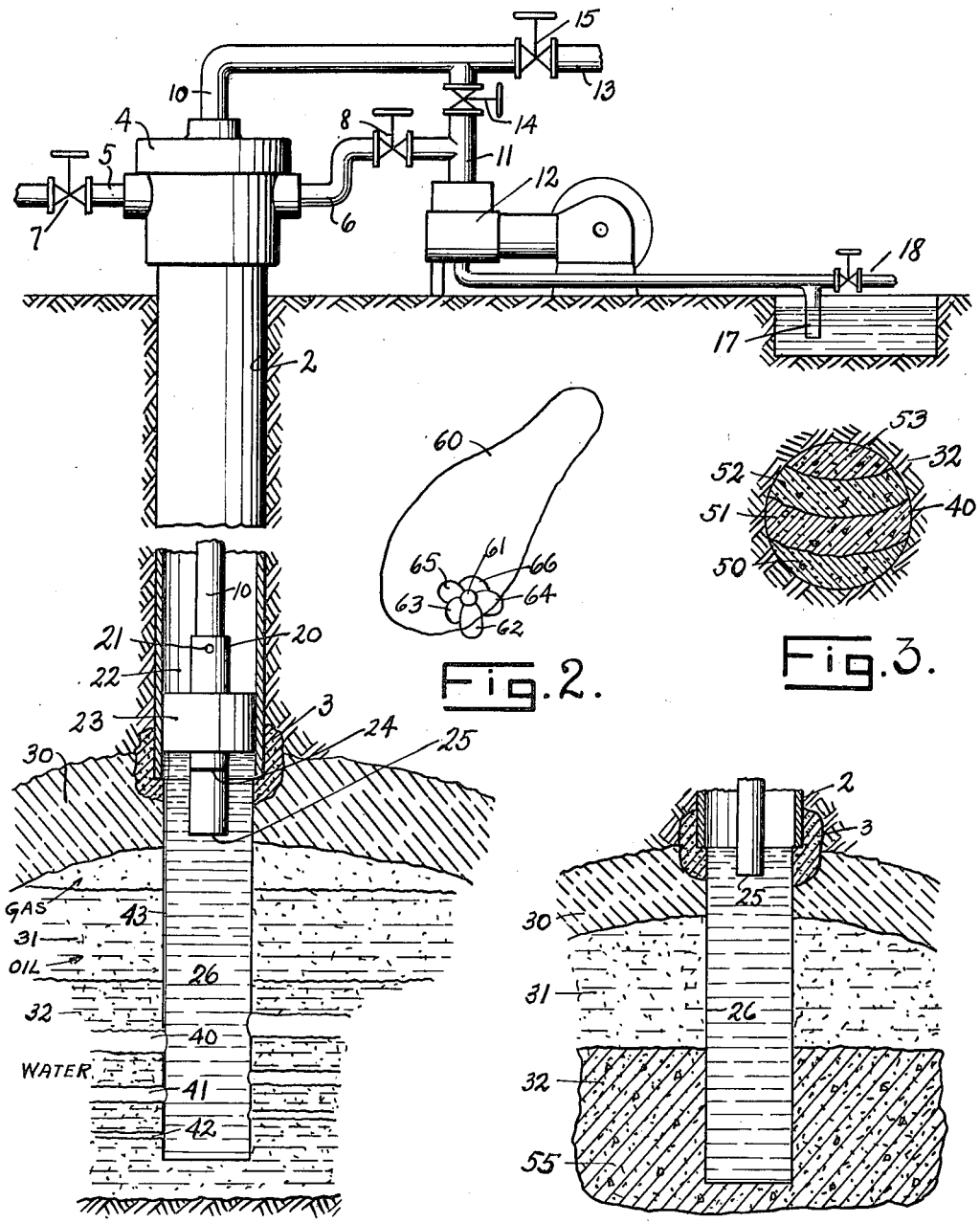
Fig. 1 is a side view illustrating a diagrammatic arrangement of a well which is being treated in accordance with the invention.
Fig. 2 is a top plan view looking down upon an oil field in which a well is being cemented and illustrating the manner in which the cement is forced into the porous formation.
Fig. 3 is a transverse sectional view of a pore in the formation and illustrating the accumulating deposits of cement.
Fig. 4 is a broken detail section showing the block of cement in the water sand.

The apparatus which is utilized in practicing the invention is illustrated diagrammatically and includes a casing 2 which is positioned in the well bore and may be sealed off at its lower end by cement 3. A casinghead 4 closes the well and has the flow lines 5 and 6 extending laterally therefrom. The line 5 may be controlled by a valve 7 while the line 6 is controlled by a valve 8.

An operating pipe 10 is sealed in the casinghead and may have one branch 11 thereof connected to the pump 12 and another branch 13 arranged to be connected to any suitable source of fluid under pressure or to discharge from the well in event the circulation is reversed.

The valve 14 in the branch 11 and the valve 15 in the branch 13 are arranged to control the flow thru these lines. The section of the pump is indicated as extending into a pit 17, or it may be connected to the suction line 18 to pump any desired type of fluid into the assembly.

Inside of the casing 2 the operating pipe 10 carries what is generally known as a circulating joint 20 which can be manipulated by movement of the pipe 10 to open the port 21 so as to allow flow of liquid to occur either into or out of the annular space 22 inside of the casing. A retainer or packer 23 is arranged to be manipulated by the tubing so as to form a seal inside of the casing and may contain a back pressure valve 24. The pipe 10 has its lower end 25 extending below the retainer so that fluid may be discharged thru the pipe into the area 26 in the well bore below the casing 2.

The well bore is shown as having penetrated the cap rock or impervious formation 30, the oil and gas sand 31 and the lower reaches of the porous formation at 32 which contains the water to be excluded.

The lower reaches of the formation 32 are illustrated as having large pores 40 therein, intermediate pores 41 and the smaller pores 42. These of course are diagrammatic and are arranged for purposes of illustration.

What is generally known in the art as squeeze cementing is accomplished by forcing the cement into the formation under pressure and retaining the cement under pressure if desired until it has taken its initial set so that the blocking of the formation is insured. With the present invention the depth of the well is of course known to the operator and the well is preferably cleaned out so as to have as clear a liquid in the hole as possible. The pipe or tubing is then run into position and the cement retainer 23 properly set to seal the casing and is preferably set at an elevation just above the producing formation, such as 31 and 32. The casinghead 4 is arranged about the tubing 5 so as to form a seal and to close the area 22 in the casing around the outside of the tubing 10. The tubing 10 is of course arranged to move vertically so as to operate the circulating joint 20 and to also set or release the retainer if desired. In some instances no retainer need be used.

In a well which is filled with a column of liquid the weight of this liquid is effective as a static pressure against the face 43 of the open formation which is exposed to such column of liquid and it is contemplated that the cement in practicing the present invention will be pumped into the formation at a pressure which is a function of the depth of the well. After considerable study and experimental practice a formula has been devised for ascertaining the proper pressure which is the maximum to be used in forcing cement into a formation. This formula has been worked out as a pressure in pounds per square inch which is computed by taking such a pressure which is forty percent of the depth of the well in feet and then adding to that pressure a constant which has a value approximating one thousand, but which may vary, depending upon circumstances and conditions as much as four hundred, so that it may be considered as one thousand either plus or minus two hundred so that the smallest maximum pressure which is to be added to forty percent of the depth of the well in feet is eight hundred and the maximum is twelve hundred.

Inasmuch as the water in the water sand 32 is usually a salt water, it has been found that there is no coagulation or other chemical reaction in connection with the cement or the formation if a salt water is used as distinguished from the use of a clear water which is not salty. Therefore, it may be generally understood in this description, where the term water is used it is intended that it will be salty water which can be detected by taste and is similar to the salty water in that particular well. In some instances, however, fresh water or water containing other chemicals may be used as circumstances require.

With the parts in the condition as above noted the well is ready to be treated and the pump 12 is operated so as to pass this salty water thru the pipe 10 and into the area 26 in the open formation. It has been found that a sand such as 31 which contains oil and gas will not accept a salty water at the same pressure at which the same sand containing water such as the lower reaches of the sand at 32. This is possibly due to the greater viscosity of the oil in the sand and the natural pressure in the oil containing sand due to capillary attraction.

When the water is pumped into the well at the calculated pressure it will be forced against the face of the formation 43 and will naturally tend to enter the pores 40, 41 and 42. If the water enters the pores then the operator is aware of the fact that the well is ready to be cemented. If, however, the pressure required to cause the well to accept the water approaches the calculated pressure, it has been found that if such pressure is held on the formation for a short period of time, that the formation appears to crack, break down or explode in the manner similar to a formation which is subjected to explosives and it is probable that this hydraulic pressure being greater than the static pressure to which the formation was previously subjected, causes a fracturing and rendering of the formation which opens up additional areas because it has been found that after a certain critical pressure has been reached which almost approximates the calculated pressure, that after this accepting effect is created, thereafter the formation will take water at a much lesser pressure. In other instances, however, the formation will take the water readily without any fracturing or exploding consequences.

When the operator has determined that the formation will take this water at less than the calculated pressure, he is then ready to introduce the cement.

It is believed that the introduction of large volumes of cement causes a scouring of the pores in the formation because in actual practice it has been possible to introduce large volumes of cement and after a certain preliminary amount of cement is introduced it has been found that, as a matter of fact, the pressure required to cause the formation to accept additional cement becomes lower and lower; whereas, one would normally expect the pressure to increase, due to the introduction of the cement but this has not been found to be a fact. After making a study of this phenomenon it was conceived that if only a small batch of cement were introduced and then permitted to take its initial set, that undoubtedly a thin layer or deposit of cement would occur upon the walls of the pores in the porous formation. A test could then be made to determine whether or not the pores had been filled by introducing a batch of water to follow the cement. It was found that a greater pressure was required to introduce the water following the cement than had been necessary to introduce the cement, indicating that the pores had been partially closed. After the cement had taken its initial set it was found that if another batch of cement was introduced that another deposit was made in the pores and on the faces of the formation which still further restricted the pores and after this second batch had taken its initial set, if water was introduced it was found that still a greater pressure was required so that this procedure was repeated time and again until the pores were completely closed.

As an illustration of how these deposits might be made attention is directed to Fig. 3 where a pore 40 is shown in the formation 32. Inasmuch as this pore is in a substantially horizontal position it seems clear that as the cement is forced into the pore it would form a deposit such as 50 along the lower circumference of the pore, that after this deposit had taken its initial set the next batch would form its deposits such as 51, the third batch a deposit such as 52 and the fourth batch a deposit such as 53 to finally close the pore. This is merely illustrative, however, because it is intended that a sufficient number of batches will be introduced to close the pore. In actual practice in several hundred wells the maximum which has been found to be necessary in the most porous formations has been six batches.

It is also possible that the first batch instead of making a deposit such as 50 in the pore may close a large pore such as 40 completely because naturally the cement will enter the pore 40 before it would enter the pore 41, due to the fact that the pore 40 is the larger so that it is possible that the first batch might close the larger pore such as 40, the next batch would close pores such as 41 and the subsequent batches would close succeedingly smaller pores. The general theory, however, is that the lower reaches of the porous formations such as the water sand 32 will have the pores thereof filled with the cement so as to cause any encroachment of water to fall around the body of water or cement which is formed. Such a block is illustrated diagrammatically in Fig. 4 at 55. It seems clear that any encroachment of water to get into the sand 31 would have to pass around the block 55 and could only move into the sand 31 upon depletion of the oil and gas therein so that it has been found that in actual practice, cementing of the well by this batch method results in a substantial reduction if not elimination of the water and a very substantial increase in the production of oil or gas.

There is another phase of the theory of operation which is illustrated in Fig. 2 where the outline 60 illustrates an oil field and a particular well such as the well of Fig. 1 is shown at 61. The water encroachment in a well near the edge of the field would come from the outer edge of the field. Naturally therefore the sand 32 toward the outer edge of the field or the lower right hand side of the well 31 as defined in Fig. 2 would be the most porous and it is quite likely that when the first batch of cement is introduced that it would flow along the line of the least resistance and it would possibly take the configuration illustrated by the outline 62. The next batch of cement following the first would follow the path of the next least resistance and might take the configuration of the outline 63 or it might split up and follow the outline 64 as well as the outline 63. The next succeeding batches might fill out the periphery around the well bore such as the batches 65 and 66. This is believed to occur because of the fact that the pressure required to introduce the succeeding batches of cement gradually increases, indicating that either the sand is less porous and requires more pressure; the area which will accept the cement is lesser or the cement is being forced thru a greater amount of sand in order to be introduced.

With the well 61 as viewed in Fig. 2 after all of the batches of cement have been introduced it seems clear that a solid block such as 55 has been formed which will practically prevent the encroachment of water.

As will be apparent from the seven types of wells which are to be treated, the different wells must be treated differently and in some instances the pressure in pounds per square inch is computed at 40% of the depth of the well plus one thousand or the maximum pressure which it has been found advisable to use is two hundred greater than the one thousand, while in other instances the one thousand less two hundred can be used as the maximum so that the constant to be used will have a maximum value of twelve hundred and a minimum value of eight hundred, it being desirable to exceed the minimum of eight hundred only when the calculated pressure using eight hundred is found to be insufficient to cause the cement or the water to be admitted to the formation.

The cement undoubtedly enters cracks, crevices, channels, fissures, large pores, quick sand or a porous zone having a high permeability and it has been found that if this cement cannot be squeezed into the formation at the calculated pressure of forty percent of the depth plus a maximum constant of twelve hundred, that the formation is probably filled and additional pressure is unnecessary and probably dangerous because the pressure above that calculated might force the cement into the production zone of the oil or the gas and destroy the well.

In practically every instance where a batch of cement is introduced it is desirable to follow it by enough water to displace the cement from the area 26 in the well bore beneath the retainer 23 and of course the volume of this area plus the volume of the pipe 10 can be determined so that a definite amount of water can be added which acts as a plug to force the cement along ahead of it and it has been found in actual practice that if this theory is followed that after the cementing has been completed and the well is cleaned out, that in many instances the well bore has been practically free of cement.

In some instances where all of the cement cannot be forced into the formation by the addition of this slug of water without exceeding the calculated pressures, cement may be left in the tubing 10 and to remove this before it sets the circulation from the pump 12 can be reversed by closing the valve 14 and opening the valves 8 and 15. The tubing then is manipulated to open the circulation joint 20 and allow water to flow downwardly into the area 22 into the port 21 and should wash out the tubing 10 by discharging the water thru the branch 13.

The initial set of the cement has been found to require about three hours but of course this period may vary depending upon the temperature and pressures encountered and it has been found with wells of less than four thousand feet that cement on the market known as "Portland Oilwell Cement" is preferable because of its setting properties but with wells of a greater depth than four thousand feet ordinary cements which are resistant to high temperatures can be used satisfactorily.

In some instances a single small batch may be sufficient to shut off or reduce the undesirable fluid, be it gas or water, because the small batch does not scour out the pores of the formation.

In some wells having a low fluid level sufficient pressure might not obtain from the first batch of cement and care is necessary to avoid scouring out the first batch so that if the pressure does not build up to anywhere near the calculated pressure when introducing the first batch of cement, then this batch should be followed by as little water as possible, merely enough to displace the cement into the formation and out of the tubing 10 and the area 26 in the well below the retainer. In order to check these calculations it may be necessary to run wireline measuring devices into the well so as to be sure that all of the cement has been displaced.

The size of the batch of cement is of vital importance and in actual practice it has been found that a batch of more than fifty sacks evidently causes scouring in the porous formation because the pressure drops off after the introduction of approximately fifty sacks and the maximum pressure is obtained when introducing about thirty-five sacks and for this reason thirty-five sacks has been determined as the most advantageous amount to be introduced in any one batch. Of course this may vary depending upon the depth of the hole 26 or the depth of the formation 32 into which it is being introduced and in some instances the diameter of the hole, while the nature of the formation will also have an important bearing upon the exact technique to be followed in any particular well.

Cement will not set in a gas zone unless the formation has first been killed by inpumping water.

It has been found that it is impossible to cement both a water and a gas sand at the same time with a single batch of cement because if either sand accepts the cement it will not penetrate the other sand but where the present batch method is followed a batch is forced into one sand and the next batch into the other. Thus the lower area 32 of Fig. 1 could be cemented with one batch and the gas at the top of the portion 31 cemented with another batch.

In some instances if the area 26 is of considerable length the lower reaches of the formation may be closed by desisting from the pumping operation before all of the cement is discharged from the area 26 and after the upper portion of the formation has been treated, then this block can be cleaned out of the lower portion and the lower reaches of the formation then subjected to the batch treatment.

The present invention is useful in determining at what elevation or into what formation the water leaves or enters the well. Thus if it is known that say thirty barrels is the volume of the pipe 10 and area 26 and when water is pumped in behind the cement it is found that the pressure drops off, when say twenty five barrels have been introduced, it then is probable that five barrels of cement remain in the bottom of the hole and that the water has broken thru the formation at a point just above the cement. On the other hand if all the thirty barrels enters the well without any drop in pressure it is an indication that the cement is all displaced.

It has been found that after a batch has been completed it is best to allow a permanent set to occur for a period of three days and when drilling out the batch it is best to discontinue drilling when two or three feet from the bottom of the bore 26 and to watch carefully the nature of the cement being drilled and in any event to stop drilling when the bit passes from soft cement into hard cement.

There are certain essential instructions or conditions which must be followed in the various types of wells being cemented and for purposes of illustration the following rules are given which should be followed in practicing the invention:

I. Pressure to be applied is figured at 400 pounds per thousand feet of hole plus 1,000 pounds (constant), plus or minus 200 pounds, i. e. a 4,000 foot well requires a minimum pressure of 2400 pounds per square inch and a maximum pressure of 2800 pounds (4,000 × .40, plus 1,000 plus or minus 200). This pressure should always be corrected for any fluid but water in the tubing, and the surface pressure therefore assumes a column of water in the tubing to the bottom of the well.

A. Insufficient pressure may not effectively shut off the water in a well bore open to production and the minimum pressure must be attained.

1. It is desirable that the squeeze operations result in pipe line oil wells (no water), for if this is not attained, the well will usually return to its previous condition within thirty to ninety days.

(a) This does not apply to the water which at first appears with the oil, and decreases day by day until water is no longer present in the oil. This seldom exceeds ten percent and should fall to three percent in a week.

(b) A shallow well usually must be bailed dry before the oil will reenter the bore of the hole after squeezing.

B. Excess pressure not only shuts off the water but frequently delays the reentry of oil into the bore of the hole after the squeeze operation, and in some formations shuts off the oil as well as the water entirely because the oil formation may be fractured.

1. Fresh water pumped into the oil zone sometimes delays the reentry of oil and for this reason it is advisable to use formation water which is not too salty and whose $S_2O$ content is dissipated.

(a) When squeezing wells that contain bentonite mixed with the oil sand, it is almost imperative that salt water be used even to mix the cement, to prevent excessive swelling.

II. Small batches of thirty to forty-five sacks of cement are to be used at a time, squeezed into the bore of the hole and displaced into the formation where it is allowed to set for about three hours.

A. The type of cement used is governed by the depth of the well.

1. Always mix the cement 15.5 pounds per gallon or heavier.

(a) A thin mix even though placed and set, is not strong enough to withstand production pressures.

(b) The heaviest mix is considerably diluted when it enters water bearing channels.

2. Use Portland oil well cement in wells less than 4,000 feet deep and wells whose temperatures are less than 125° in the formation.

(a) Be sure to specify oil well cement, as builders cement usually does not set effectively in the neat mix.

(b) This cement should take an initial set in from not less than one and one-half hours to not more than two and one-half hours at the surface.

\* Too fast a set will set in oil bearing channels before the oil has time to penetrate the slurry and prevent the set.

Too slow a set will permit the water to dilute or disturb the cement to such an extent it will not set effectively if it is still in position.

3. Use slow set cements in deep high-temperature wells.

4. Do not use adulterants in the cement mix because the strength is reduced and uneven hydration may result.

(a) Bentonite only weakens the strength of the cement—the angle of repose, for which purpose bentonite is usually used, is higher with a heavier cement than would be possible by the addition of the adulterant, and still be pumpable. Such adulterants also increase the coefficient of expansion, causing the set cement to shrink from the wall of the channel after setting.

5. Test every batch of cement pumped into the well, by taking a sample of the actual mechanically mixed slurry that is being pumped therein, as this is the only accurate check yet known for successful operations.

B. The ultimate success of the operation restricts the size of the batches to thirty to forty-five sacks each.

1. Less than thirty sacks does not always produce a higher subsequent pumping pressure, therefore is not always effective.

2. More than forty-five sacks causes the loss of pressures already raised, because it is so abrasive and only cuts a larger channel in the formation instead of partially filling it.

3. If the cement job has failed behind the casing, the first small batch will go there and by being allowed to set, will prevent subsequent pressures during operation from going up behind the casing, collapsing it on the tubing.

4. If the maximum predetermined cementing pressure is arrived at, before all of the thirty-five sacks have been pumped into the formation, it requires very little pressure on the casing of the well to reverse the excess out of the tubing.

(a) Tubing full of cement in a 4,000 foot well will require nearly 2,000 pounds pressure to reverse out of tubing, and this pressure may easily rupture the casing. Such an operation is further endangered by the possible break-down of mechanical equipment.

(b) No well has yet required more than six batches of thirty-five sacks each properly applied to obtain the required pressure, and this has so lowered the cost of the cement used, that the retainer pays for itself as much as ten times over.

C. Follow each batch of cement with enough water to clear the bore of the hole below the cement retainer, to the bottom of the well.

1. Cement slurry will enter the largest channel and the following water will enter the smaller unfilled channels, if the cement enters formation above the bottom of the hole.

(a) This leaves the bore of the hole clear for subsequent operations.

2. Cement will not enter formation appreciably unless there are cracks, crevices, pores or quicksands present.

(a) Water cannot be pumped thru an oil saturated sand with a porosity as great as 500 millidarcys, even at extreme pressures.

(b) It is also difficult to pump oil thru a water saturated sand under similar conditions. This is most attributable to the emulsification and increased viscosity of oil and water.

3. While pumping a batch of cement into the hole, if the pressure rises to the maximum predetermined pressure, and stands for five minutes, cease operations.

4. If the testing water pressure after waiting three hours after a batch of cement has been pumped into the bore of the hole, stands for ten minutes at the minimum pressure, predetermined, cease operations.

(a) Even though there is no cement left in the bore of the hole, if water cannot be pumped therein at these pressures, the well will not produce water, unless there is some bridge or other undetermined obstruction in the hole.

5. The well should not make water as long as new original (virgin) hole is not made.

(a) As a protection when drilling in, it is sometimes advisable to make extra hole in shallow horizons before squeezing to allow for this contingency.

III. Allow at least thirty-six hours before drilling out the retainer and three days before testing the hole.

A. Stop drilling operations when the cement changes from soft to hard, after drilling below the bottom of the casing, and try for production.

1. It is desirable that the well be bailed or swabbed, or pumped—that all fluid be removed from the hole, for a complete test to allow the water to find new channels to flood the oil into the bore of the hole.

(a) A squeezed well can seldom if ever be jetted in because of the pressure of the gas on the producing zone.

B. If the cement is hard all the way down the bore of the hole, stop drilling a few feet from the original bottom and test. (I. A. 1)

C. Allow the well at least three days for the oil to reenter.

1. After the oil starts into the bore of the hole, full potential, will occur in a week or ten days, or as soon as the water pumped into the formation during squeeze operations has been recovered.

IV. Never acidize after a squeeze operation except as a last resort.

A. If acidizing is necessary, it should be done before squeezing and may even be done thru the retainer before or during batch squeezing as this may be the only means to force acid into oil bearing horizons due to acid's greater affinity for water bearing limes.

B. All new wells that must be acidized for production should be squeezed thereafter to shut off the water that enters because of acid about 95% of the time.

V. The recovery of oil after shutting off water may be normally expected to increase three to five times on wells making less than 20 barrels per day, with all the water the pump can handle, thereafter making no water and requiring pumping only a few hours daily, with a minimum of rod, tubing, pump and unit break-downs.

A. This refers to steady production only, and excludes large initial producers whose production is usually erratic.

B. The water may be excluded in large producing wells at least without reduction of potential production.

VI. This entire method is not operable to my knowledge for the reduction of gas in water-white distillate producers, nor for the exclusion of water in wells which produce fresh water without minerals of any kind in appreciable quantities (affect normal taste).

VII. This method is operable to the same degree, whether reducing gas-oil ratios, or excluding water at any depth, or both with one setting of a cement retainer.

A. The single operable exception to this method (excluding VI) is the exclusion of water in a gas well.

1. Instead of squeezing batches until the predetermined pressure is reached, the operations are halted when there is a subsequent drop in pressure after a previous batch of cement has been placed.

(a) This drop indicates that the water is entering the gas zone, instead of a water bearing channel.

B. The success of this method has been conclusively demonstrated in wells from 900 feet deep to 12,000 feet after previous diligently applied methods have failed—with or without the assistance of a cement retainer, and includes all generally known types of formation.*

C. It has been also conclusively demonstrated that it is impossible to shut off both water and gas with any single batch of cement when equally exposed under normal well conditions.

While the shutting off or reducing of water has been specifically described it is intended that the shutting off or reducing of any fluid such as a gaseous fluid is intended.

---

*I herein refer to unconsolidated sands, thin lenses containing both oil and water, all lime formations, as well as their interlying dobies or clays, with the exception of serpentine which I have not attempted because of the nature of this production make a squeeze appear foolhardy.

Conclusion

The squeeze operation essentially places a large "block" of cement somewhere into the formation and so increases the area around it thru which the water must channel, that it merely exerts a pressure on the bottom of the oil flooding it into the bore of the well and does not gain sufficient velocity to cut a channel around the plug.

What is claimed is:

1. A method of cementing a porous formation in a well to shut off the encroachment of an undesirable fluid which comprises introducing a small batch of cement slurry into the formation, permitting an initial set thereof, introducing a second batch, allowing an initial set thereof, and testing the formation by applying a liquid pressure of less than a predetermined amount which is computed as a proportion of the depth of the well being cemented, plus a constant which may vary between eight hundred and twelve hundred.

2. A method of cementing a porous formation in a well to shut off the encroachment of an undesirable fluid which comprises introducing a small batch of cement slurry into the formation, permitting an initial set thereof, introducing a second batch, allowing an initial set thereof, testing the formation by applying a liquid pressure of less than a predetermined amount which is computed as a proportion of the depth of the well being cemented, plus a constant between eight hundred and twelve hundred, and repeating such batch procedure and alternate testing with liquid pressure until the pressure required to force liquid into the formation approaches the calculated pressure.

3. A method of introducing cement in batches into a well bore to close off a porous formation which comprises the steps of forcing a batch of cement slurry into the formation at a pressure in pounds per square inch which does not exceed an amount calculated as forty percent of the depth of the well in feet plus a constant of twelve hundred.

4. A method of introducing cement in batches into a well bore to close off a porous formation which comprises the steps of forcing a batch of cement slurry into the formation at a pressure in pounds per square inch which does not exceed an amount calculated as forty percent of the depth of the well in feet plus a constant of twelve hundred, allowing the cement to take an initial set, and testing to see if the formation is still porous by applying a liquid to the formation at a pressure which does not exceed the calculated pressure.

5. A method of introducing cement in batches into a well bore to close off a porous formation which comprises the steps of forcing a batch of cement slurry into the formation at a pressure in pounds per square inch which does not exceed an amount calculated at forty percent of the depth of the well in feet plus a constant of twelve hundred, allowing the cement to take an initial set, testing to see if the formation is still porous by applying a liquid to the formation at a pressure which does not exceed the calculated pressure, and repeating the cementing and testing until the calculated pressure is approached while introducing either the cement or the liquid.

6. A method of introducing cement in batches into a well bore to close off a porous formation which comprises the steps of forcing a batch of cement slurry into the formation at a pressure in pounds per square inch which does not exceed an amount calculated as forty percent of the depth of the well in feet plus a constant of twelve hundred where the batch does not exceed forty-five sacks of cement mixed into a slurry.

7. A method of introducing cement in batches into a well bore to close off a porous formation which comprises the steps of forcing a batch of cement slurry into the formation at a pressure in pounds per square inch which does not exceed an amount calculated as forty percent of the depth of the well in feet plus a constant of twelve hundred where the volume of liquid does not exceed that required to empty the well bore of cement.

8. A method of introducing cement in batches into a well bore to close off a porous formation which comprises the steps of forcing a batch of cement slurry into the formation at a pressure in pounds per square inch which does not exceed an amount calculated as forty percent of the depth of the well in feet plus a constant of twelve hundred where the batch does not exceed forty-five sacks of cement mixed into a slurry, and where the volume of liquid does not exceed that required to empty the well bore of cement.

9. A method of closing porous formations about a well bore which comprises introducing a batch of cement slurry to form a deposit partially filling the pores of the formation, allowing the deposited slurry to take an initial set, subsequently making additional deposits until the pores are filled, and testing for porosity by applying liquid pressure after each batch where the pressure in pounds per square inch does not exceed an amount calculated as forty percent of the depth of the well in feet plus twelve hundred.

10. A method of cementing wells to shut off the entrance of water which comprises the steps of pumping salty water into the well at a pressure in pounds per square inch which does not exceed the amount calculated as forty percent of the depth of the well in feet plus twelve hundred, then introducing into the well a batch of not more than forty-five sacks of Portland oil well cement mixed with water to form a slurry having a specific gravity of not less than fifteen and one-half pounds per gallon, following the batch with salty water until the batch of cement is displaced from the well bore into the formation at a pressure not exceeding the calculated pressure, allowing the cement to take an initial set, then introducing alternately additional salty water and similar batches of slurry into the formation and allowing the cement to take an initial set before introducing the salty water, and repeating the procedure until the pressure required to introduce the cement or the water reaches the calculated pressure.

RAY S. KAIL.